A. F. MOORE.
SPOOL FOR PLIERS.
APPLICATION FILED APR. 3, 1919.
1,326,766.
Patented Dec. 30, 1919.
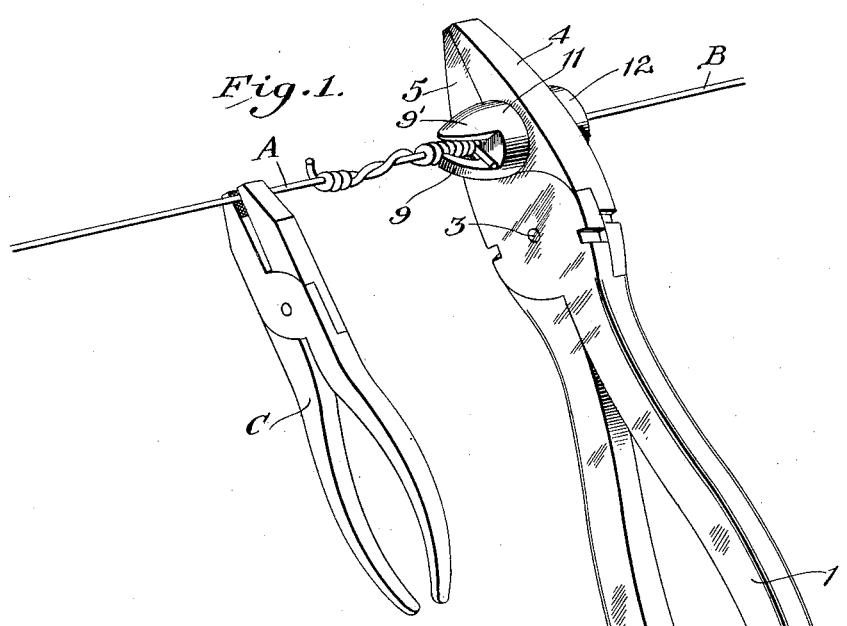
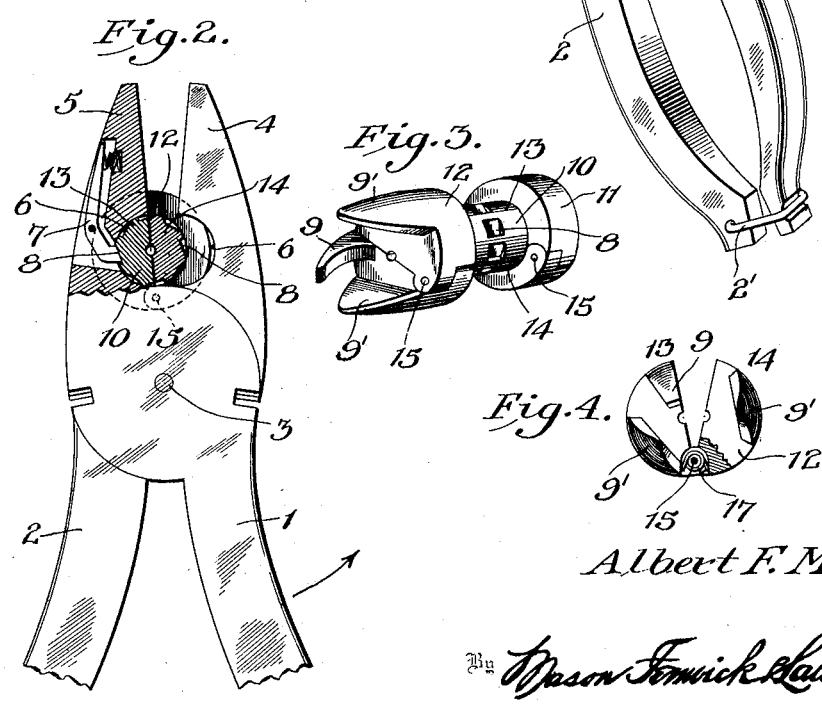
Inventor
Albert F. Moore
By Mason Fenwick Lawrence,
Attorneys

UNITED STATES PATENT OFFICE.

ALBERT F. MOORE, OF NEW MADRID, MISSOURI.

SPOOL FOR PLIERS.

1,326,766.   Specification of Letters Patent.   Patented Dec. 30, 1919.

Application filed April 3, 1919. Serial No. 287,355.

*To all whom it may concern:*

Be it known that I, ALBERT F. MOORE, citizen of the United States, residing at New Madrid, in the county of New Madrid and State of Missouri, have invented certain new and useful Improvements in Spools for Pliers; and I do hereby declare the following to be a full, clear, and exact description of the invention, such as will enable others skilled in the art to which it appertains to make and use the same.

This invention relates to wire working implements and particularly to an improved device for splicing and twisting wires to be connected together and extending coaxially at the splice.

It is one of the objects of the present invention to provide a simple, practicable, substantial, durable and comparatively inexpensive implement or device for enabling the splicing and twisting of correlated wire ends with rapidity, accuracy and facility to secure a substantial, effective and neat splice. A further object of the present invention is to improve the construction of splicing tools, especially that type in which there may be employed a separating implement in the form of an ordinary set or pair of pliers having the usual separable pincer jaws and between which there may be arranged a temporarily retained and rotatively mounted twisting device or spool, it being a particular object of the invention to provide such a spool with such details of construction and capable of such manner of operation as will enable the ready application to the spool and the separating implement to the wire ends to be twisted one upon the other with the least possible inconvenience and in the most simple manner conducive of the best practical results.

With these and other objects in view as will be rendered manifest in the following specification, the invention consists in the construction and in the combination, and in details and arrangements of the parts as clearly hereinafter set forth with relation to the embodiment of the invention illustrated in the accompanying drawings in which:

Figure 1 is a perspective view of the implement shown in the completion of a splice.

Fig. 2 is a side elevation of the implement in the partly opened position and partly broken away to illustrate the ratcheting mechanism and the position of the automatically opening sections of the spool.

Fig. 3 is a perspective view of the detached spool in the normal or closed position and, Fig. 4 is an end view of the spool in the open position.

In the embodiment herein illustrated the invention is shown as arranged in combination with a separating implement in the form of a common pair of pliers having the usual handles 1 and 2 which are pivoted together at 3 and have oppositely disposed complementary jaws 4 and 5 at the inner ends of which the faces are rabbeted and transversely concaved as at 6 to form, when the jaws are closed, a cylindrical bearing to receive the complementary cylindrical portion 10 of a wire twisting member or spool the ends of which are enlarged as at 11 and 12 to form hubs or shoulders abutting against the sides of the jaws to prevent the spool from having unnecessary longitudinal movement.

One of the important features in my present invention resides in the construction of the spool 10 of two sections 13 and 14 which are divided longitudinally and are pivotally connected together as at 15 where the hub portions are provided with complementary and over-hanging lugs through which the pivot pins extend on a line adjacent one side of the divided spool. As clearly shown in the sectional view one of the hinge pins is surrounded with a spring 17 the function of which is to normally and ordinarily open the spool sections about their pivot axis. The central portion of the spool is provided with a longitudinal and axial bore or small aperture which is formed by the closing of the sections of the spool together and which is designed to receive the jaw of the wire A or B as the case may be when the ends of the wires are to be twisted one upon the other.

As clearly shown in Fig. 2 the jaws 4 and 5 may be separated far enough to permit the insertion of the spool 10 so that its jaw will occupy the complementary bearing faces 6 when the jaws are closed and in order to secure the rotation of the spool 10 when the plier handles are oscillated with the spool as the axis one of the jaws is provided with a ratchet 7 actuated by a spring to normally throw its pawl into engagement with respective teeth 8 formed in the surface of the cylindrical portion 10 of the spool so that when the levers or pliers are oscillated in the direction indicated by the arrow in Fig. 2 the ratchet 7 serves to positively rotate the spool 10 with the pliers and bring the twisting dog 9 which extends longitudinally from one of the spool sections into abutting position against the radially extended end of the wire as clearly shown in Fig. 1. Therefore as long as the pliers are turned in the direction of the arrow the lateral end is twisted around the included wire B over which the end of the wire A is raised. It is desirable to prevent the retrograde movement of the spool in one direction or movement of the levers or pliers and to that end the end of the spool on which the wrapping dog 9 is arranged is shown as provided with diametrically opposite lugs 9′ preferably arranged on the flanks of the wrapping dog 9 the space between the lugs and the dog providing for the reception of the radially extending end of the wire by twisting and when the pliers or levers 1—2 are swung in a direction reverse to the arrow Fig. 2 then the adjacent stopping lug 9′ swings up and engages the radial extension of the wire and the spool while the levers are being reversed in oscillation.

From the above it will be seen that by my improved device it is only necessary, after the spool has been arranged in the plier bearing to open the bore of the plier whereupon the yieldingly and pivotally connected sections of the spool 10 will spring open so that the spool can be passed transversely across the wire A or B as the case may be and this is longitudinally disposed in the central jaws or wire receiving apparatus in the spool whereupon the jaws 4—5 can be closed together simultaneously closing the spool sections on the included wire after which the swinging ends of the levers 1 and 2 may be connected together by a link or bail 2′.

Obviously during the use of the implement the ends of the wires A and B are brought into juxtaposition and one of the ends is turned at right angles to the length of the wire and then the two wires are engaged by a clamping device of any suitable type as shown at C in Fig. 1 and the rearwardly extending portion of the wire to be twisted is arranged between the wrapping dog 9 and an adjacent lug 9′ and by oscillating the levers of the pliers one of the wires is twisted on the other. This twisting operation is repeated on the end of each of the wires A and B to secure the desired splice which is shown as complete in Fig. 1.

I claim:

1. In a wire twisting and splicing device, a diametrically split spool having its sections pivotally connected along one side so that the spool may open longitudinally to receive, close upon and release an inserted longitudinally extended wire, the spool having at one end a dog to engage and wrap a wire about a core strand as the spool is bodily rotated about its own axis and a pair of lugs mounted on the same end of the spool adjacent said dog for the purpose specified.

2. In a wire twisting and splicing device, a diametrically split spool having its sections pivotally connected along one side so that the spool may open longitudinally to receive, close upon and release an inserted longitudinally extending wire, the spool having at one end a dog to engage and wrap a wire about a core strand as the spool is bodily rotated about its own axis, and means tending to normally open the sections of the spool.

3. In a wire twisting and splicing device, a diametrically split spool having its sections pivotally connected along one side so that the spool may open longitudinally to receive, close upon and release an inserted longitudinally extending wire, the spool having at one end a dog to engage and wrap a wire about a core strand as the spool is bodily rotated about its own axis, and means tending to normally open the sections of the spool and an operating implement in which the spool may be temporarily and rotatively mounted and retained.

4. In a wire twisting and splicing device, a diametrically split spool having its sections pivotally connected along one side so that the spool may open longitudinally to receive, close upon and release an inserted longitudinally extending wire, the spool having at one end a dog to engage and wrap about a core strand as the spool is bodily rotated about its own axis, and means tending to normally open the sections of the spool and an operating implement in which the spool may be temporarily and rotatively mounted and retained and ratchet means for rotating the spool in one direction as the instrument is oscillated.

5. In a wire twisting and splicing device, a diametrically split spool having its sections pivotally connected along one side so that the spool may open longitudinally to receive, close upon and release an inserted longitudinally extending wire, the spool having at one end a dog to engage and wrap a wire about a core strand, as the spool is bodily rotated about its own axis, and means tending to normally open the sections of the spool and an operating implement having a transverse, divided bearing in which the spool may be readily mounted in such manner that when the members of the bearing are separated the sections of the spool automatically open to receive or release a wire.

In testimony whereof I affix my signature.

ALBERT F. MOORE.